United States Patent [19]

Ho

[11] Patent Number: 5,726,845
[45] Date of Patent: Mar. 10, 1998

[54] SHORT CIRCUIT PROTECTION FOR POWER FACTOR CORRECTION CIRCUIT

[75] Inventor: Simon Mo Chan Ho, Tai Po, Hong Kong

[73] Assignee: Astec International Limited, Wanchai, Hong Kong

[21] Appl. No.: 608,140

[22] Filed: Feb. 28, 1996

[51] Int. Cl.⁶ .................... H02H 3/28; H02M 7/00; G05F 1/563
[52] U.S. Cl. .................... 361/86; 361/88; 363/89; 323/224
[58] Field of Search .................... 361/86, 88; 363/89; 323/222, 223, 224, 285

[56] References Cited

U.S. PATENT DOCUMENTS

| | | | |
|---|---|---|---|
| 4,459,537 | 7/1984 | McWhorter | 323/224 |
| 4,525,765 | 6/1985 | Brajder | 361/88 |
| 5,001,620 | 3/1991 | Smith | 363/89 |
| 5,515,261 | 5/1996 | Bodgan | 363/89 |

OTHER PUBLICATIONS

Motorola MC34262/MC33262 Power Factor Controllers Specification Sheets, Motorola Inc., Rev. 1, 1996, pp. 1–16, 1996.

*Primary Examiner*—Jeffrey A. Gaffin
*Assistant Examiner*—Thuy-Trang N. Huynh
*Attorney, Agent, or Firm*—Coudert Brothers

[57] ABSTRACT

In a power factor correction circuit using a control power MOSFET connected in series between the boost converter and the output, overcurrent damage to the power MOSFET upon occurrence of a short circuit in the output is prevented by sensing a drop in the output voltage below a predetermined level above the peak of the rectified AC boost converter input, and shutting the power MOSFET off when such a drop is sensed.

3 Claims, 3 Drawing Sheets

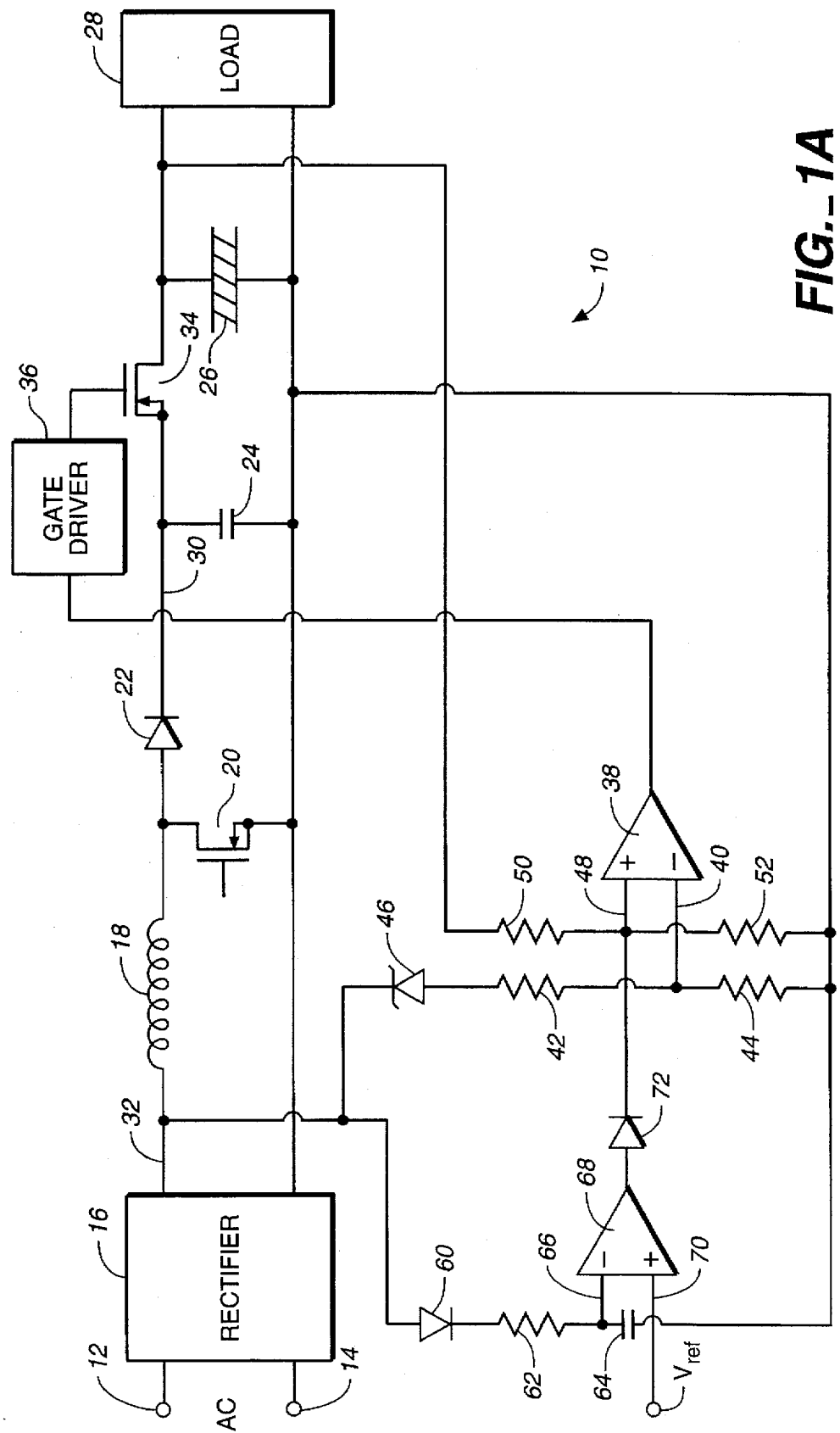
FIG._1A

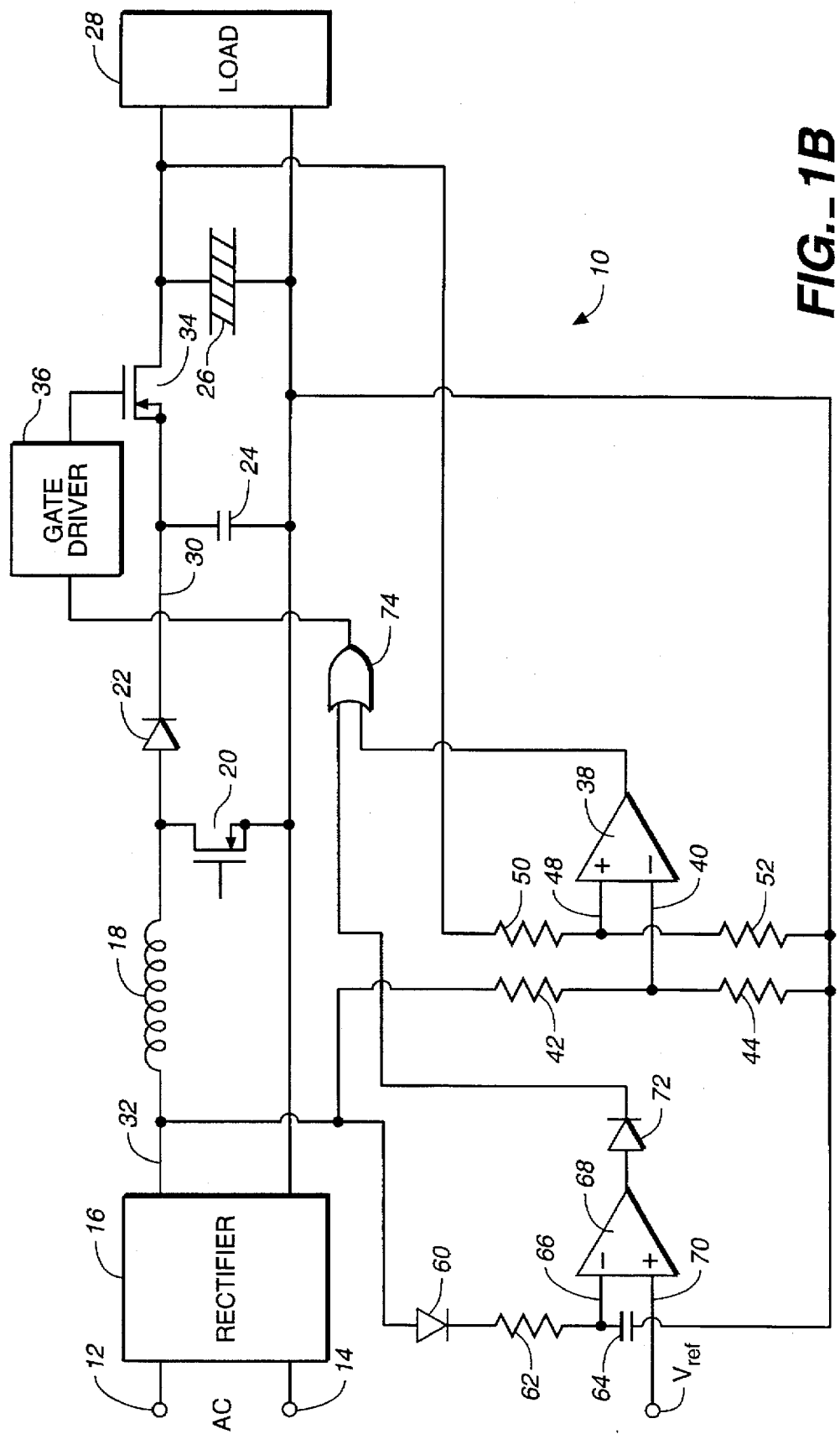
FIG._1B

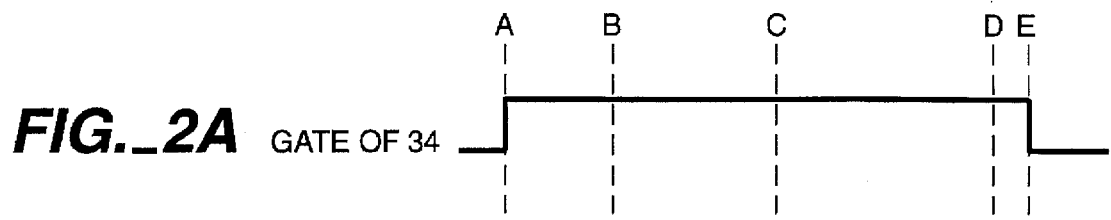
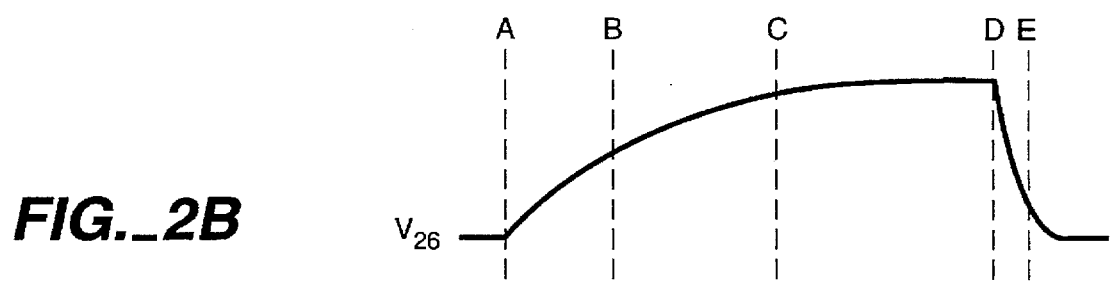
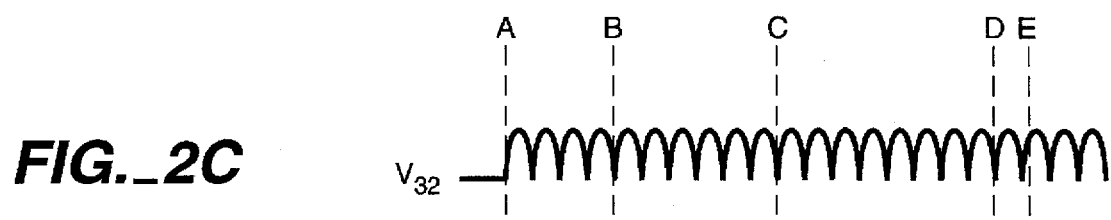
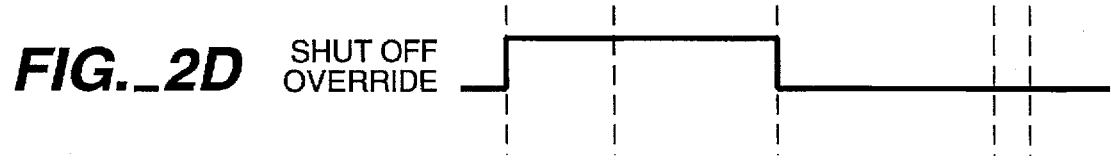
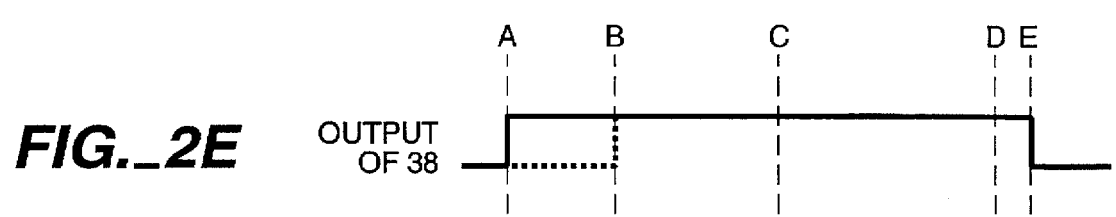
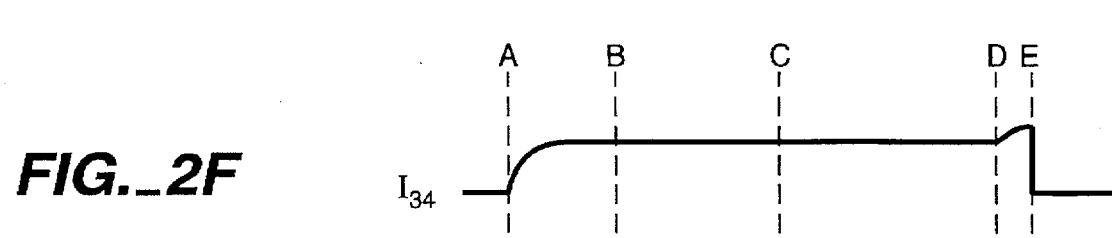

5,726,845

SHORT CIRCUIT PROTECTION FOR POWER FACTOR CORRECTION CIRCUIT

FIELD OF THE INVENTION

This invention relates to power factor correction (PFC) circuits used in power converters, and more particularly to a short circuit protection arrangement which prevents harmful current surges through the output switching transistor.

BACKGROUND OF THE INVENTION

Power converters which convert commercial AC power to regulated DC power conventionally contain a PFC circuit whose input is the raw full-wave rectified AC input power source, and whose output is a DC voltage higher than the peak voltage of the AC power source. This DC voltage output can be used as the input to a DC-to-DC converter whose output, in turn, consists of one or more regulated DC voltages.

The objective of a typical basic PFC converter is to cause the input current drawn by the converter to follow the input voltage waveform so that the converter presents a resistive load to the input power source. A typical prior art conventional switched power supply operates as a capacitive input load for the rectified line voltage. Such a load draws relatively high currents near the peaks of the alternating current cycle, and substantially zero current for the remainder of the cycle. This results in a poor power factor, which manifests itself as a larger RMS current for a given input voltage and power load, than if the load were purely resistive. Consequently, for a given line current, the typical prior art switched power supply is capable of delivering only a fraction of the power which could be delivered if the line current were sinusoidal, which is the case when the load is primarily resistive. Typically, a conventional switched-mode power supply may have a relatively low power factor, e.g., of the order of 0.65. Such a power supply would only be able to draw 160 watts from a 110-volt 12 amp power outlet. By contrast, if the power factor were unity, the supply could draw 1,320 watts from that power outlet.

Active PFC converters generally use a boost converter topology since the input current can be made to be continuous. In a typical boost topology, a boost inductor is coupled in series with a rectifier between input and output ports of the boost connector. A switch is coupled between the output side of the boost inductor and ground and is switched on and off at a frequency (e.g., 30 kHz) much greater than the AC power frequency (e.g., 50 to 60 Hz). In each switching cycle, energy is stored in the inductor when the switch is closed (ON period) and released to the output port via the rectifier when the switch is opened (OFF period). Due to the inductance of the boost inductor, the current through the switch increases nearly linearly with time during the ON period. Additionally, the current through the boost inductor during each switch cycle increases linearly during the ON period and decreases linearly during the OFF period, creating a current peak at the end of each ON period. A bulk capacitor at the output of the converter smooths this output.

In a typical basic PFC converter, a clock signal generally starts the ON-period of each switching cycle. During each ON-period, the current through the switch is measured and compared against a line voltage reference signal, sometimes called a sinewave reference signal. The line voltage reference signal has a waveform (i.e., shape) which follows the sinusoidal waveform of the input voltage. When the switch current ramps up to a value equal to the line voltage reference signal, the ON period is ended. The switch current thereby has a pulsed shape, with the envelope of pulse peaks following the line voltage reference signal. The inductor current, and hence the input current, equals the switch current during the ON periods, and ramps up during each ON period. During the OFF periods, the inductor current ramps down as the inductor couples current to the output. Accordingly, both the inductor current and the converter's input current generally follow the waveform of the line voltage reference signal. Specifically, the current peaks of the boost inductor trace out an envelope which generally has a waveform corresponding to the input voltage. The amplitude of the current peaks is regulated by using the output voltage of the PFC circuit to control the switch so as to provide sufficient output current from the PFC circuit.

Because it is necessary to control the current flow to the bulk capacitor which forms part of the boost converter, and to the output load connected across it, a power metal oxide silicon field effect transistor (MOSFET) or an IGBT is typically connected in series between the rectifier and the bulk capacitor and output load. A gate drive circuit rams the power MOSFET on and off in response to appropriate control signals.

If a short circuit occurs in the output of the PFC circuit, overcurrent sensing circuitry can be used in conjunction with the gate drive circuit to turn the power MOSFET off. Nevertheless, a large momentary overcurrent or continued operation of the power MOSFET at its upper current limit can stress the power MOSFET and reduce its useful life. It is therefore desirable to control the power MOSFET in such a way that it shuts off before a short circuit condition can ever draw excessive current through it.

SUMMARY OF THE INVENTION

The present invention accomplishes the desired result by monitoring not the power MOSFET current itself, but rather the relationship between the input voltage and the output voltage. A function of the voltage at the input to the boost converter, increased a fixed amount by a zener diode or a resistive network, is applied to one input of a comparator, while a function of the output voltage is applied to the other input of the comparator. The comparator output is applied to a gate drive which shuts off the power MOSFET if the comparison indicates a short circuit condition.

Normally, the output voltage is always higher than the zener-adjusted input voltage. When a short circuit occurs, however, on the output side of the power MOSFET, the output voltage instantly drops below the zener-adjusted peak input voltage. This condition triggers shutoff in the inventive circuit before the current through the power MOSFET has time to build up to a harmful level.

BRIEF DESCRIPTION OF THE DRAWINGS

FIG. 1a is a circuit diagram illustrating the circuit of this invention;

FIG. 1b is a circuit diagram similar to FIG. 1 but illustrating an alternative embodiment of the invention; and FIG. 2 is a time-amplitude diagram illustrating the action of the circuit.

DESCRIPTION OF THE PREFERRED EMBODIMENT

FIG. 1a illustrates a PFC circuit 10 according to a first preferred embodiment of the invention. Commercial AC power applied across terminals 12, 14 is rectified, preferably by a full-wave bridge rectifier 16, and applied to a PFC network consisting of inductor 18, switching transistor 20, diode 22, and capacitors 24 and 26. The output of circuit 10 is applied to a DC-to-DC converter 28 which converts the unregulated DC output of circuit 10 into one or more regulated DC voltages for DC power supplies.

The network consisting of inductor 18, switching transistor 20, diode 22 and capacitors 24 and 26 constitutes a conventional boost converter. The function of the boost converter is to make the DC voltage on line 30 substantially higher than the peak voltage of the rectified AC supply on line 32. Its use and functioning in achieving power factor correction is detailed in U.S. Pat. No. 5,001,620, which is incorporated herein by reference.

Power transfer from the input to the output of the circuit 10 is controlled by power MOSFET 34, which in turn is controlled by a conventional gate drive circuit 36. The gate drive circuit 36 translates in a conventional manner the output of comparator 38 into a control signal appropriate for mining power MOSFET 34 on and off. The gate circuit 36 is so arranged that it rams the power MOSFET 34 off when the output of comparator 38 is low.

The subtractive input 40 of the comparator 38 is connected to the center point of a voltage divider consisting of resistors 42 and 44. The voltage divider 42, 44 is connected in series through a zener diode 46 to line 32, i.e. the unboosted rectified AC input power voltage. The additive input 48 of the comparator 38 is connected to the center point of a second voltage divider consisting of resistors 50 and 52. The voltage divider 50, 52 is connected to the output voltage appearing across bulk capacitor 26 and the input of the load, DC-to-DC converter 28.

In the embodiment of FIG. 1a, the resistance ratio $R_{50}/R_{52}$ of resistors 50, 52 is made equal to the ratio $R_{42}/R_{44}$ of resistors 42, 44 by making $R_{42}=R_{50}$ and $R_{44}=R_{52}$. Consequently, the gate drive circuit 36 will turn the power MOSFET 34 on when $V_{26}>V_{32}+V_{46}$, and will turn it off when $V_{26} \leq V_{32}+V_{46}$, where $V_{26}$ is the output voltage, $V_{32}$ is the voltage on line 32, and $V_{46}$ is an offset voltage equal to the zener voltage of zener diode 46. Inasmuch as the latter condition exists on startup of the circuit 10, gate drive circuit 36 must not respond to the shutoff signal from comparator 38 until the bulk capacitor 26 has been sufficiently charged through power MOSFET 34 to bring $V_{26}$ to the former condition.

This startup override may be accomplished in many conventional ways, of which the following is merely exemplary: $V_{32}$ is also applied through diode 60 to an RC network 62, 64 whose midpoint is connected to the subtractive input 66 of comparator 68. The additive input 70 of comparator 68 is connected to a source of reference voltage $V_{ref}$. The resistance $R_{62}$ of resistor 62, the capacitance $C_{64}$ of capacitor 64, and the reference voltage $V_{ref}$ are so dimensioned as to cause the output of comparator 68 to be substantially positive until the bulk capacitor 26 has had time to charge to a voltage higher than the peak of $V_{32}$. At that time, the output of comparator 68 goes negative, and diode 72 disconnects it from the input 48 of comparator 38. The circuit 10 thereafter functions in its normal mode described above.

If a short circuit occurs in the output of circuit 10 while circuit 10 is in normal operation, $V_{26}$ will drop sharply to a value lower than $V_{32}+V_{46}$. This drives the output of comparator 38 negative and causes the gate drive circuit 36 to immediately shut off power MOSFET 34, before a substantial increase in current flow (delayed by the action of bulk capacitor 26) can occur through power MOSFET 34.

The circuit 10 of FIG. 1b is the same as that of FIG. 1a except for the omission of the zener diode 46 and the use of a different conventional startup override circuit. The offset voltage of the zener diode 46 can be created in the circuit of FIG. 1b without the zener diode 46 by so scaling the voltage dividers 42, 44 and 50, 52 in a conventional manner that a constant voltage differential of $V_k$ exists during normal operation between the inputs 40 and 48 of comparator 38. The power MOSFET then turns on if $V_{26}>V_{32}+V_k$, and shuts off if $V_{26}<V_{32}+V_k$.

In the circuit of FIG. 1b, the startup override function is accomplished by ORing the outputs of comparators 38 and 68 in an OR gate 74 so as to enable gate driver 36 whenever the output of either comparator is positive.

FIG. 2 illustrates the time relationships involved in the operation of the circuit 10. At power-on time A, $V_{26}$ is zero. In the circuit of FIG. 1a, the output of comparator 38 (curve (e)) nevertheless goes high because the shutoff override signal from comparator 68 (curve (d)) applied to input 48 of comparator 38 is high on startup. In the circuit of FIG. 1b, the output of comparator 38 is low at turn-on (as shown in phantom in curve (e)), but the shutoff override signal enables the gate driver 36 through OR gate 74.

The bulk capacitor 26 now begins to charge (curve (b)). When it has reached sufficient charge at time B for $V_{26}$ to be greater than $V_{32}$ plus $V_{46}$ or $V_k$, the output of comparator 38 goes (or remains) high to keep the power MOSFET 34 on. As the bulk capacitor 26 continues to charge toward full operating voltage, the shutoff override signal (d) goes low at time C but this now has no effect because $V_{26}$ keeps the output of comparator 38 high.

If a short circuit now occurs at time D, $V_{26}$ rapidly drops. The power MOSFET current (curve (f)) tries to rise, but before it can rise very far, $V_{26}$ has dropped to a value lower than $V_{32}$ plus $V_{46}$ or $V_k$. This causes the output of comparator 38 to go low at time E and shut the power MOSFET 34 off.

It will be seen that the present invention provides a simple and effective way to handle short circuits in the output of a PFC circuit without stressing the power MOSFET.

What is claimed is:

1. A power factor correction circuit including a short circuit protection system, said power factor correction circuit comprising:

a source of rectified AC voltage;

a boost converter circuit connected to said source;

an output of said power factor correction circuit;

a switch connected in series between said boost converter and said power factor correction circuit output;

a gate driver arranged to control the state of said switch; and a comparator having an output connected to said gate driver, for causing said gate driver to change the state of said switch when the output of said comparator changes state, said comparator including a pair of inputs, one of said inputs being connected to said source of rectified AC voltage so as to produce at said input a voltage representative of said rectified AC voltage plus a predetermined offset voltage, and the other of said inputs being connected to said power factor correction circuit output; said inputs being connected so as to cause the output of said comparator to change state such that said switch is turned off whenever said voltage of said power factor correction circuit output is greater than said rectified AC voltage plus said offset voltage.

2. The system of claim 1, in which said offset voltage is produced by a zener diode connected in series between said soiree of rectified AC voltage and said one of said inputs.

3. The system of claim 1, in which said one of said inputs and said other of said inputs are connected to said source of rectified AC voltage and to said power factor correction circuit output, respectively, through resistive voltage dividers, the resisters of said voltage dividers being so scaled as to produce said offset voltage between said inputs.

* * * * *